(12) United States Patent
Wheaton

(10) Patent No.: US 7,062,862 B2
(45) Date of Patent: Jun. 20, 2006

(54) RETRACTABLE RULE

(76) Inventor: Randall D. Wheaton, 11520 Bodega Hwy., Sebastopol, CA (US) 95472

( * ) Notice: Subject to any disclaimer, the term of this patent is extended or adjusted under 35 U.S.C. 154(b) by 0 days.

(21) Appl. No.: 11/063,188

(22) Filed: Feb. 22, 2005

(65) Prior Publication Data

US 2005/0183279 A1    Aug. 25, 2005

Related U.S. Application Data

(60) Provisional application No. 60/546,438, filed on Feb. 19, 2004.

(51) Int. Cl.
*G01B 3/10* (2006.01)

(52) U.S. Cl. .......................................... 33/757; 33/771

(58) Field of Classification Search ................ 33/492, 33/493, 755, 757, 758, 759, 768, 770, 771
See application file for complete search history.

(56) References Cited

U.S. PATENT DOCUMENTS

| | | | | |
|---|---|---|---|---|
| 1,274,292 A | * | 7/1918 | Little | ........................... 33/493 |
| 1,947,392 A | | 2/1934 | Gusterman | |
| 2,319,724 A | | 5/1943 | Dinhoffer | |
| 3,032,151 A | | 5/1962 | Allen | |
| 4,275,503 A | | 6/1981 | Bergkvist | |
| 4,352,244 A | | 10/1982 | Tomuro | |
| 5,063,686 A | * | 11/1991 | Peloquin | ...................... 33/757 |
| 5,894,677 A | * | 4/1999 | Hoffman | ...................... 33/758 |
| 6,145,210 A | * | 11/2000 | Walczynski | .................. 33/458 |
| 6,643,947 B1 | | 11/2003 | Murray | |
| 6,898,866 B1 | * | 5/2005 | Weeks | .......................... 33/762 |
| 2002/0073570 A1 | * | 6/2002 | Conder | ......................... 33/758 |
| 2005/0183279 A1 | * | 8/2005 | Wheaton | ...................... 33/755 |
| 2006/0000104 A1 | * | 1/2006 | Patton | .......................... 33/755 |

FOREIGN PATENT DOCUMENTS

EP         9823 A1   *  4/1980
JP    09005001 A    *  1/1997

* cited by examiner

*Primary Examiner*—R. Alexander Smith
(74) *Attorney, Agent, or Firm*—Dergosits & Noah LLP

(57) ABSTRACT

A retractable rule assembly including a housing and reel rotatably mounted in the housing and having an elongated blade formed from ribbons of metal. One end of the blade is connected to the reel and extends from a position tangential to the reel outwardly through a spaced opening in the housing assembly. When retracted within the housing assembly, the blade is in the form of an abutting volute coil. The blade is configured through the use of first and second ribbons connected to one another to provide improved standout characteristics and increased torsional rigidity as compared to conventional blades currently available.

19 Claims, 5 Drawing Sheets

RETRACTABLE RULE

RELATED APPLICATIONS

The present application is based upon provisional U.S. application Ser. No. 60/546,438 filed on Feb. 19, 2004.

TECHNICAL FIELD

The present invention involves retractable rule assemblies generally known as tape measures which are formed of spring steel blades coiled within a housing and which can be paid from the housing as a distance measuring tool. The present invention is intended to improve upon currently available retractable rule assemblies in configuring their metal blades for improved standout, torsional rigidity and coiling characteristics.

BACKGROUND OF THE INVENTION

Anyone even marginally involved in the building trades has employed a device commonly referred to as a tape measure or more accurately, a spring retractable tape rule assembly, in which a blade, usually configured of a metal ribbon is coiled within a housing and which extends from the housing from a position tangential to its reel outwardly through a spaced opening in the housing assembly. These blades are further generally configured with hooks appended to their extreme ends and bent at a 90° angle for releaseable attachment to a ledge or other surface of a monument in order to measure the distance from it.

When employing the retractable rule assembly as described above in which relatively short distances are measured, such a tool has proven to be accurate, convenient to use and virtually indispensable to anyone having the need to make linear measurements. However, this same convenient tool can be frustrating to use when measured distances are increased. In such circumstances, the low flexural stiffness and torsional stability of the blade limits its maximum standout length. In other words, the metal blade tends to buckle and collapse or roll over from its linear extended orientation making it difficult to extend the blade for taking convenient and accurate length measurements. When this occurs, a user must generally retract the metal blade back within its housing before attempting to achieve blade extension, hopefully, without collapse.

Current retractable rule assemblies have employed blades having concavo-convex cross sections in order to provide some measure of bending stiffness. Although curving the blade cross section does increase its maximum standout length and thus reduces tape buckle and collapse, it does little to prevent rollover, and when distances become large enough, even a curved blade does not prevent such collapse. In addition, the concavo-convex blade cross section often times results in the inability to obtain accurate length measurement readings and introduces errors when attempting to employ demarcations along the blade for distance marking. This convex shape also makes it difficult to releaseably hook the blade to a vertical edge and measure horizontal distances for the convex shape results in the blade's strong tendency to rollover and thus unhook itself. Current blades also are difficult to employ in making a measurement when the blade extremity supporting the hook is pushed against an obstacle such as a corner in order to obtain an inside measurement because the blade buckles and collapses when confronted with a relatively small axial load.

Others have recognized the shortcomings inherent in using single ribbon retractable rule assemblies. For example, in U.S. Pat. No. 3,032,151, it was proposed that a metal beam be configured of two convex metal ribbons welded together at their edges "having an inherent tendency to assume a rectilinear state that is efficiently flexible to permit coiling." Although the patentees were correct that such a dual ribbon configuration did greatly improve standout and torsional rigidity, the blade disclosed therein did not acceptably coil within the tape measure housing to create a usable commercial product. Specifically, when the dual ribbon blade of the configuration disclosed in the '151 patent is coiled, large compressive stresses and buckling of the inside layer develop. This causes severe distortion of the dual ribbon blade which prevents tight packing of the coils and thus severely limits the length of tape that could be stored in a conventional housing. Also, the method of joining as proposed for this device results in a severally limited fatigue life, further rendering it unsuitable for commercial applications.

Another "solution" to this problem was suggested in U.S. Pat. No. 2,319,724 in which a conventional tape was reinforced by providing a plurality of separate but overlapping metallic plates which, according to the patentee, acted to prevent the tape from buckling or bending so that it could be extended for greatly increased lengths. This product required the reinforcing plates to be individually removed, plate by plate, in coiling the tape within its retractable rule assembly housing. This tedious task made the product commercially unsuitable.

Yet another approach was suggested by U.S. Pat. No. 1,947,392 whereby a hollow rod was proposed being configured of at least two metal bands disengageably coupled with each other along their longitudinal edges and at the same time being at least partially curved in cross section and adapted to be jointly wound in a flat state after disengagement. However, in using such a device, an inordinately large force was required to retract the tape noting that the multipart blade did not coil compactly within a housing of acceptable dimension unless very short tape lengths were employed.

It is thus an object of the present invention to provide a retractable rule assembly having a blade with improved standout and torsional rigidity to enable the blade to maintain its rigid linear orientation when extended relatively long distances from the assembly housing and easily retracted to a compact coil within the housing.

It is yet a further object of the present invention to provide a retractable rule assembly in which its blade has improved stability enabling one to handle the blade in virtually any orientation at or near maximum standout in push or pull applications.

It is yet a further object of the present invention to provide a retractable rule assembly in which its blade can be easily restored to its beam shape following inadvertent collapse without retracting and reextending the blade as is necessary in current commercial products.

These and other objects will be more readily appreciated when considering the following disclosure and appended claims.

SUMMARY OF THE INVENTION

The present invention is directed to a retractable rule assembly including a housing and reel rotatably mounted in the housing and having an elongated blade formed from ribbons of metal. One end of the blade is connected to the reel and extends from a position tangential to the reel outwardly and through a spaced opening in the housing assembly. When retracted within the housing assembly, the blade is in a form of an abutting volute coil spring.

The elongated metal blade of the present invention is in the form of first and second ribbons of elongated metal joined to one another along their lengths. Several embodiments are disclosed, all intended to produce a blade with improved standout and torsional rigidity which may be readily and compactly coiled within the housing. The first embodiment achieves these objectives by providing two ribbons joined along their length wherein the first ribbon is provided with a thickness which is greater than that of the second ribbon. In the second embodiment, at least one of the joined ribbons is characterized as having a thickness which is variable by providing thinned regions created therein along the centerline of the ribbon's width. In the third embodiment, which can be employed either alone or in conjunction with the other disclosed embodiments, the geometry of the blade is established as a relationship between the thickness of the blades, the width of the unjoined portion, and the radius of the coiled blade within the housing.

By employing the above-noted embodiments, the blade of the retractable rule assembly of the present invention not only exhibits improved standout and torsional rigidity, but can be coiled within the assembly housing providing a compact useful tool unachievable by applying the teachings of the prior art.

DETAILED DESCRIPTION OF THE INVENTION

Figure 1A:
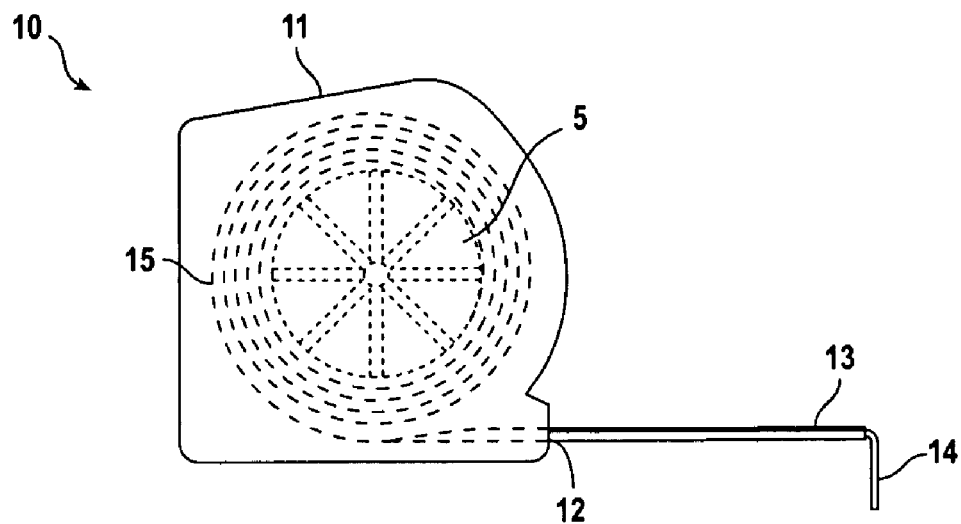
FIGS. 1a and 1b are side plan views of typical retractable rule assemblies of the prior art.

As noted previously, the present invention involves a retractable rule assembly. Such rule assemblies of the prior art are shown as element 10 of FIGS. 1a and 1b. Specifically, retractable rule assembly 10 includes housing 11 enclosing reel 5 rotatably mounted in housing 11 as support for abutting volute coil 15 of tape measure or blade 13. Blade 13 has one end connected to the reel and extends from a position tangential to the reel outwardly through spaced opening 12 in housing assembly 11. Commonly, when blade 13 is retracted within housing assembly 11, it is in the form of abutting volute coil 15.

In use, blade 13 is releaseably appended to a ledge on monument through right angle hook 14 whereupon blade 13 is paid-out from housing 11 by unwinding coil 15 spring biased within housing 11. Typically, blade 13 is in the form of a slightly curved metal ribbon which helps to maintain standout for short distances from spaced opening 12.

Figure 1B:
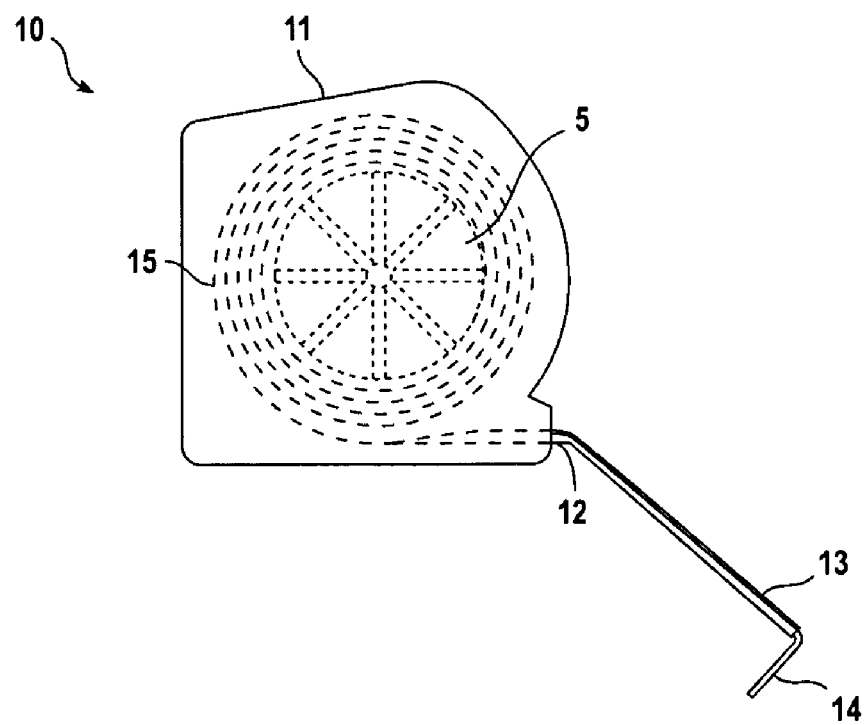

When distances are short, blade 13 remains linear as shown in FIG. 1a. However, as depicted in FIG. 1b, when distances increase from tangential opening 12, ribbon 13 tends to buckle or roll over which is a situation quite frustrating to a user. When this occurs, generally, blade 13 must again be withdrawn within housing 11 and paid-out through opening 12 in an attempt to extend blade 13 without buckling. Again, as mentioned previously, prior attempts to minimize this phenomenon have proven unsuccessful for although others have been able to increase standout distances, the blades of the prior art have either been so complex as to defy commercialization or have not adequately been able to form tight coils, or their torsional rigidity was little better than that of a ribbon with no curvature at all.

The limitations of the prior art have been successfully addressed by incorporating one or more of the embodiments of the present invention. The first such embodiment is disclosed in FIG. 2.

Figure 2A:
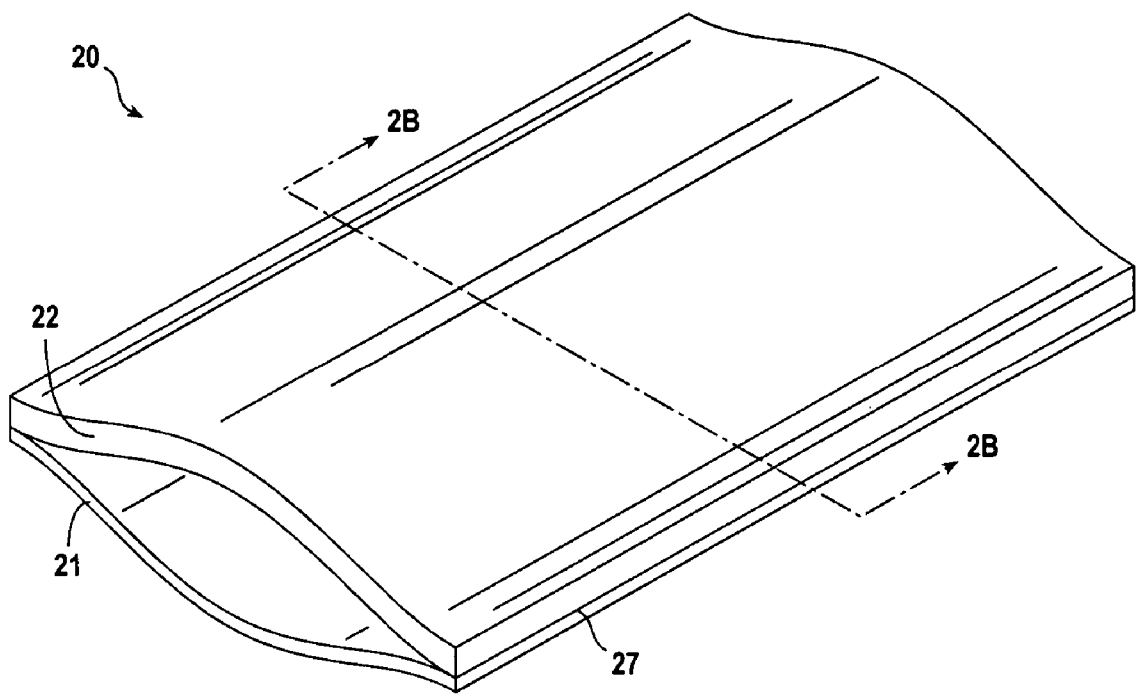
FIG. 2a is a perspective view of an elongated blade made pursuant to the first embodiment of the present invention.
Figure 2B:
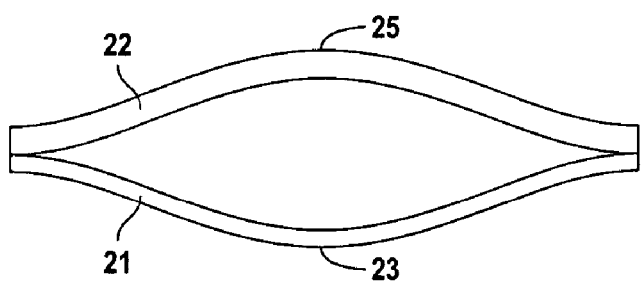
FIG. 2b is a cross-section of the blade of FIG. 2a taken along line 2b—b thereof.

Turning to FIG. 2a, a perspective view of a first embodiment of the present invention in the form of blade 20 is shown. FIG. 2b, in turn, shows a cross-sectional view of said embodiment, being comprised of metal ribbons 21 and 22. As in the prior art, metal ribbons 21 and 22 comprising composite blade 20 can be wound to create a reel in the form of an abutting volute coil 15 of FIG. 1 within housing 11 and extending from a position tangential to the reel and outwardly through a spaced opening such as opening 12 in housing 11.

Figure 2C:
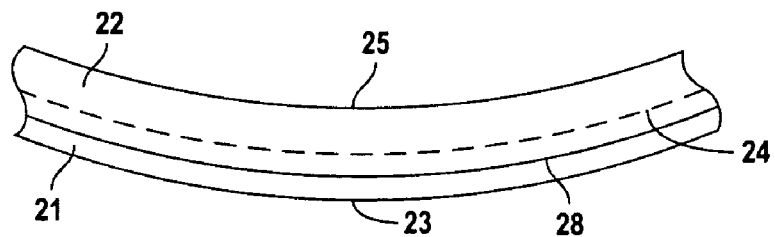
FIG. 2c is a partial cross-sectional view through the longitudinal axis of an elongated blade in a coiled orientation produced pursuant to the present invention.

Specifically, elongated metal blade 20 is configured in the form of first and second ribbons 22 and 21 of elongated metal being joined to one another along their longitudinal edges 27. Blade 20 can be retracted within its housing assembly in the form of an abutting volute coil which coils more easily and much more compactly than prior art structures of this type. The attributes attributable to the blades of the present invention are achieved in this instance by providing first ribbon 22 of thickness greater than the thickness of the second ribbon 21. The first ribbon 22 is considered the top layer of composite blade 20 and is therefore the inner layer of the continuously abutting volute coil of the retracted state of blade 20. Said inner layer is subject to large compressive stresses inducted by the bending of the blade 20 as it retracted into said coil. Large compressive stresses can result in distortion and buckling of said inner layer (as was the case with the prior art) which increases the force required to retract the blade and greatly increases the diameter of the resulting coil. The coiling characteristics of the present blade 20 are superior to the prior art because, as is shown in FIG. 2c, the neutral axis of bending 24 (the axis along which there is neither axial tension nor compression) is not at the interface of two ribbons of equal thickness, as it was in the prior art, but is at the midpoint between surface 23 and surface 25 which is, in fact, a longitudinal axis within ribbon 22. As a result of said neutral axis 24 lying within ribbon 22, said ribbon is now subject to both tensile and compressive stresses, the sum of which produces a net reduction in the average compressive stress in ribbon 22. The combination of lower compressive stress and a relatively thicker section reduces or eliminates distortion and buckling of ribbon 22 and produces coiling characteristics far superior to the prior art. Although wide latitude can be taken in choosing ribbon thicknesses, ideally, first ribbon 22 should have a thickness of approximately 0.0025 to 0.0050 inches and second ribbon 21 should have a thickness of approximately 0.001 to 0.0025 inches. The greater the ratio between the thicknesses of ribbon 22 and ribbon 21, the better the coiling characteristics of blade 20. Too great a ratio, however, can be detrimental in other respects. Most ideally, the thickness of first ribbon 22 is approximately 1.5 to 2.0 times the thickness of ribbon 21.

In continuing the discussion of FIGS. 2a and 2b, it is noted that surface 25, being the top surface of blade 20, would have rule demarcations printed or embossed thereon. Because of the superior bending stiffness and torsional stability of said blade, however, it can be used with equal facility in any special orientation so distance markings can also be placed on surface 23 of ribbon 21 and said markings may conveniently be used for distance measurements at the user's discretion. The distance markings on surfaces 25 and 23 may be of the same or different measuring schemes or units to further enhance the utility of the present invention relative to the prior art.

FIG. 2c shows blade 20 in its substantially flattened orientation when coiled within housing 11. It is noted that the tube-like structure shown in FIGS. 2a and 2b collapses allowing for a suitable abutting volute coil far superior to similar configurations of the prior art.

Figure 3A:
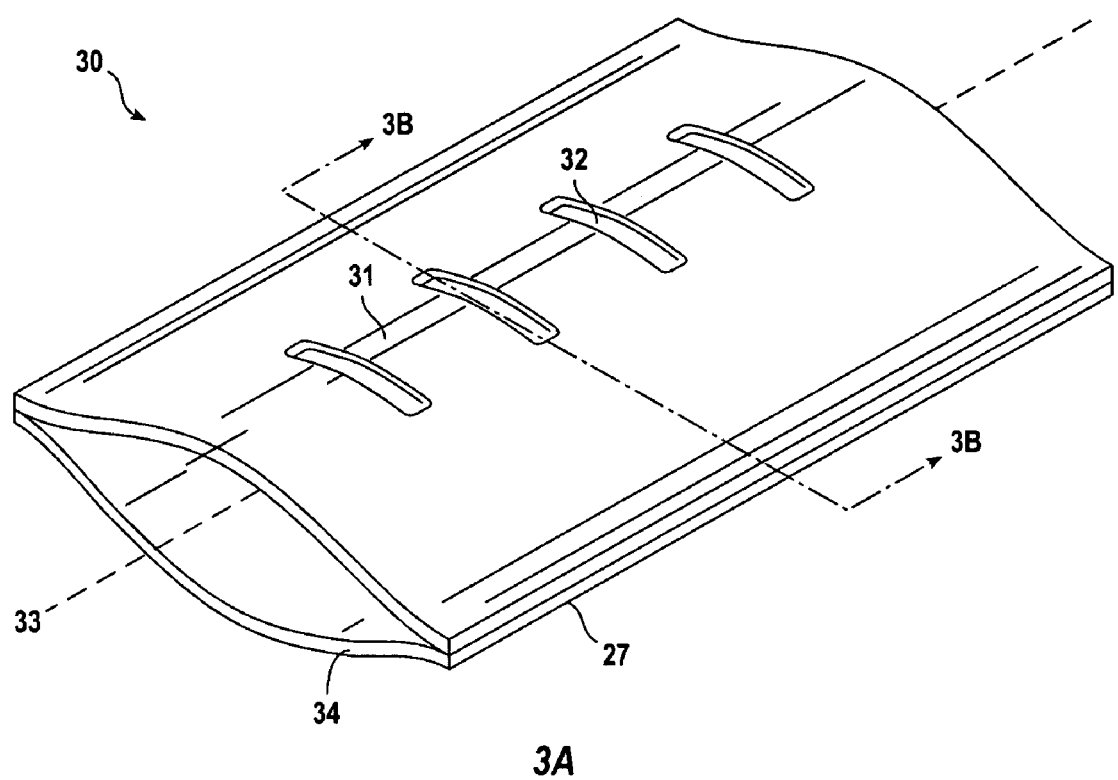
FIG. 3a is a perspective view of the second embodiment of the present invention.
Figure 3B:
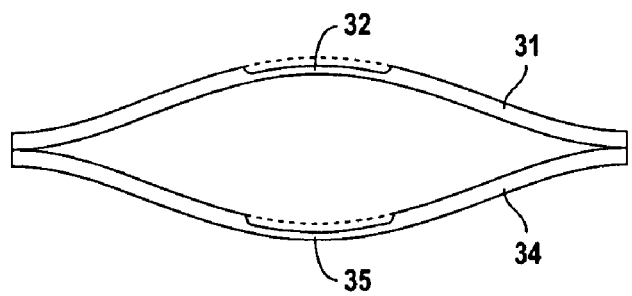
FIG. 3b is a cross sectional view taken along line 3b—3b of FIG. 3a thereof.

Yet a further iteration of the present invention can be visualized when reference is made to FIGS. 3a and 3b. Again, ribbon 30 is intended to be employed in a typical housing 11 and, when residing therein, assumes the orientation of abutting volute coil 15. As was the case with the embodiment shown in FIG. 2, the elongated blade 30 of FIG. 3 is comprised of two ribbons of metal 31 and 34. Blade 30 is characterized as having longitudinal axis 33 along which both metal ribbon layers are connected such as by welding.

Turning again to the second embodiment of the present invention, metal ribbons 31 and optionally ribbon 34 are characterized as having thicknesses which are variable by providing at least one thinned region 32 and optionally two thinned regions 32 and 35 created along the centerline 33 of the ribbons' widths.

In practicing the invention of FIG. 3a, it is noted that upon coiling, the thinned regions 32 and 35 are beneficial in two respects. First, the outer layer 34 of the coil of conjoined ribbons is more easily extensible in the longitudinal direction and the inner layer 31 is more easily compressible, thus promoting ease of coiling of blade 30. Second, and most importantly, the thinned sections 32 of the inner layer 31 predispose said layer to deflect in the direction of outer layer 34 at the point of incipient buckling. The outer layer 34 retards said deflection and can thus prevent buckling altogether.

Although not absolute necessary to the invention, it is preferred that the thinned sections should not be aligned with one another longitudinally, even though they are shown as aligned in FIG. 3b. Misalignment promotes smoother packing of the coil within the housing and a full thickness region in the outer layer can better prevent buckling as discussed above.

Further, it is noted that while thinned sections 32 in ribbon 31 are necessary to this embodiment, thinned sections 35 in ribbon 34 are not and may be omitted. Providing said thinned sections in both ribbons promotes marginally improved coiling characteristics, while omitting thinned sections 35 may provide a marginal improvement in standout length. In either case, this embodiment achieves the goal of improving on the prior art by simultaneously providing a blade with greatly improved standout and torsional rigidity, and one which still may be easily and compactly coiled within a standard housing.

It is proposed that, ideally, each thinned region be approximately between 25% to 75% of the thickness of the ribbon outside of said thinned regions. Also, it has been recognized that in order to achieve the design goal of the present invention, the thinned regions 32 and 35 not extend the entire width of blade 30. As shown in FIG. 3a, the thinned regions traveling down the center line or longitudinal axis 33 of blade 30 should only be configured within metal ribbons 31 and/or 34 within a partial distance of the width of blade 30. Along these lines, it is proposed that thinned regions 32 and/or 35 be only approximately 25 to 75% of the width of each ribbon 31 and 34. Finally, it is noted that the embodiments shown in FIGS. 2 and 3 may be combined to further achieve the goals of the invention.

Figure 4:
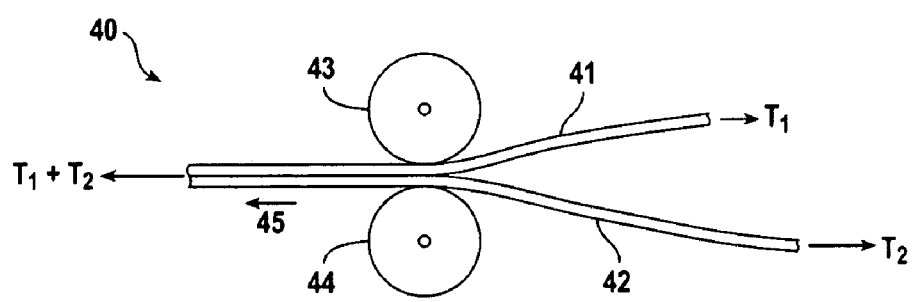
FIG. 4 is a side plan view of an assembly showing the creation of a blade which can be employed in practicing the present invention.

The goals of the present invention can further be achieved by practicing the method illustrated in FIG. 4. As noted previously, in all embodiments of the present invention, the elongated blade made a part of the retractable rule assembly is constructed by the joining of two metal ribbons. Most preferably this is done by welding the ribbons along their edges. FIG. 4 shows a schematic of such an operation wherein a welding station at rollers 43 and 44 join metal ribbons 41 and 42. However, rather than merely welding metal ribbons 41 and 42 together, it has been determined that benefit can be achieved by applying different tensions to the ribbons such that $T_1$ is not equal to $T_2$ although the combination of $T_1+T_2$ is realized in moving blade 40 in the direction of arrow 45. It has been found that if a slightly greater tension is applied on the metal ribbon which assumes the inside position when blade 40 is wound within housing 11, a more suitable coil 15 is achieved. Again, this differential tensioning applied during the welding operation can be employed alone or in conjunction with the other embodiments disclosed herein in achieving a blade with improved standout and torsional rigidity while minimizing the impact that a dual layer blade would have upon the coiling operation.

It is contemplated that the present invention is applicable to blades having various profiles while achieving the advantages inherent herein. FIGS. 5a–5e illustrate five of the myriad of blade configurations useful in carrying out the present invention.

Figure 5A:
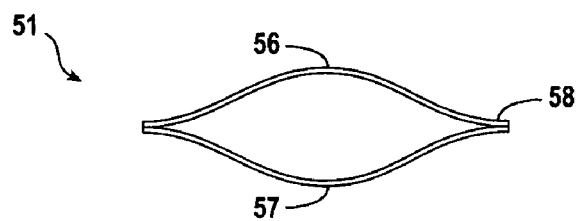
FIGS. 5a–5e are cross sectional views of various blade configurations useful in practicing the embodiments of the present invention.

Turning first to FIG. 5a, it is shown that metal ribbons 52 and 53 are joined by continuous welds 58 in creating blade 51. As in all configurations disclosed herein, ruled demarcations can be employed on both surfaces of blade 51 to enable the retractable rule assembly to be used with either metal ribbon 56 or ribbon 57 facing upwards and towards an observer.

Figure 5B:
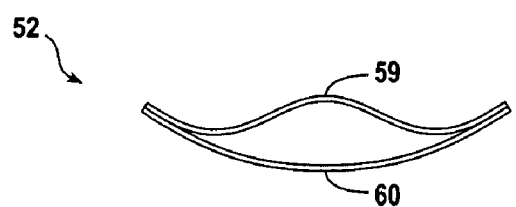

FIG. 5b is a variation of the blade shown in FIG. 5a in that blade 52 is comprised of ribbon 59 welded to ribbon 60. Blade 52 may be used in the orientation shown to achieve maximum standout, or it may be inverted so that ribbon 60 faces upward while ribbon 59 rests relatively flatly upon a planar surface. This can often times present a convenient and quite user friendly configuration as a convex bottom ribbon causes the distance markings to be raised off of the work surface making accurate distance measuring and marking difficult.

Figure 5C:
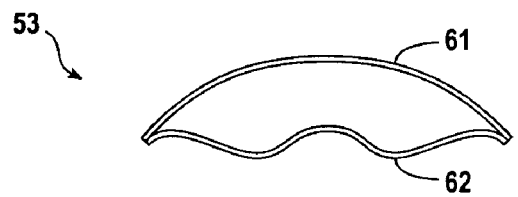

FIG. 5c illustrates a blade configuration 53 comprised of ribbons 61 and 62 which combines the superior standout and torsional rigidity of the blade shown in FIG. 5a with the useful feature of the blade shown in FIG. 5b, that the distance markings on ribbon 61 lie close to the work surface for user convenience and increased accuracy of measurement.

Figure 5D:
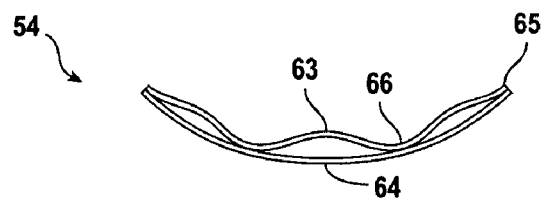

Yet a further iteration of a blade useful herein is shown as blade 54 in FIG. 5d wherein ribbon 63 is welded to ribbon 64 not only along the edges 65 but at the transverse intermediate points 66. This configuration provides standout and torsional stability significantly greater than the convex blades of the prior art while still providing coiling characteristics far superior to the prior art for multi-ribbon blades.

Figure 5E:
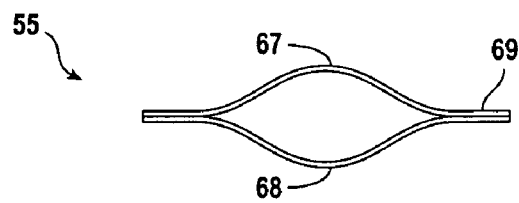

FIG. 5e shows a blade 55 composed of ribbons 67 and 68 joined along their edges 69. Blade 55 is similar to the prior art for multi-ribbon blades in that it has a simple lenticular shape. Unlike the prior art, however, blade 55 may be easily and compactly coiled inside a standard tape rule housing. The superior coiling characteristics are achieved by selecting blade parameters using the criteria discussed hereinafter for the prevention of blade distortion and buckling during recoiling.

Figure 6:
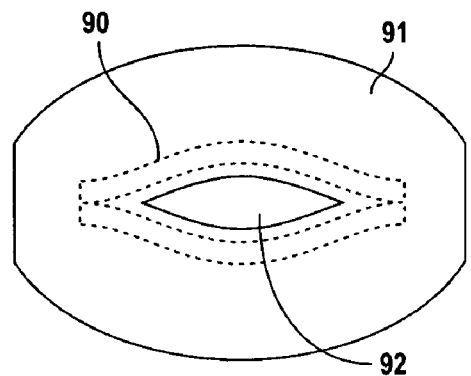
FIG. 6 is a side view of a radial hook useful in employing the retractable rule assembly disclosed herein.

The various embodiments of the present invention can also be employed with a 360° radial hook such as that shown in FIG. 6. Specifically, blade 90 can be made to terminate upon disk 91 to facilitate the releaseable attachment of elongated blade 60 to an edge feature of a monument (not shown). Air passage 92 promotes coiling and uncoiling of blade 90. Thus, one need not be restricted to the mere right angle attachment means 14 (FIG. 1) in practicing the present invention.

It may be understood from the foregoing discussion that the use of conjoined metal ribbons to form a closed cross-section, tubular shape is of considerable benefit when producing a blade for a spring retractable tape rule. It should also be understood that the ability to easily retract said blade and have it form a tight coil within the housing using existing light-weight springs is equally important. All of the prior art has failed to meet this retractability criterion for reasons discussed previously. While the various embodiments of the present invention do meet this goal, further improvement in ease of retraction and tight coiling can be achieved by practicing the methods discussed herein. As noted previously, in all embodiments of the present invention, the elongated blade portion of the retractable rule assembly is constructed by the joining of two metal ribbons longitudinally at two or more transverse locations, most preferably by welding.

Figure 7A:
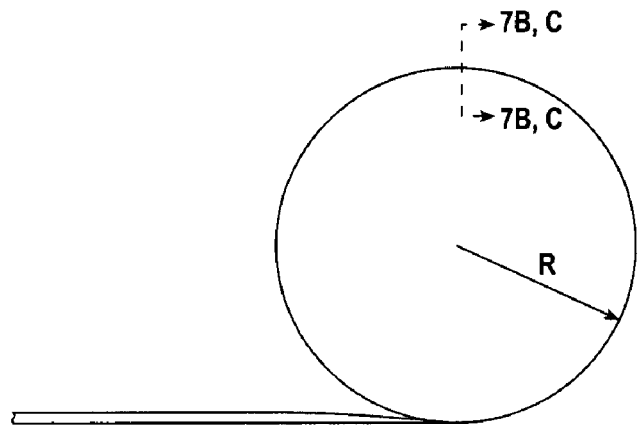
FIGS. 7a–7c are schematic illustrations of a blade being formed into a volute coil and in cross-section in order to illustrate important dimensions and relationships as described hereinafter.
Figure 7B:
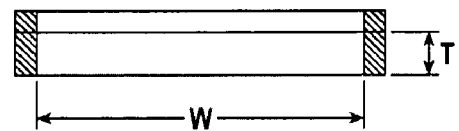
Figure 7C:
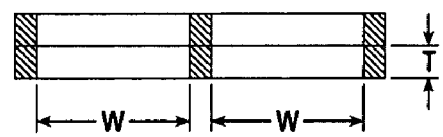

It may be appreciated, however, that some such constructs are more easily retracted and form a tighter coil than others. The primary factors determining blade performance in this regard are illustrated in FIGS. 7a–7c. These factors are the thickness, T, of the ribbon which will be the inside layer upon coiling, the width, W, of the unjoined portion of the ribbons between the weld zones, and in the event of multiple welding zones which are characteristic of the embodiments of, for example, FIGS. 7c and 5d, W is the width of the widest unjoined portion of the blade, and the radius, R, to which the conjoined ribbons will be coiled. More specifically, the product of the thickness times the width, divided by the radius, or (WT/R), must be less than the critical buckling ratio $(WT/R)_{CR}$, to ensure that the inner ribbon does not buckle and, in fact, remains as flat and distortion free as possible. It may be further appreciated, however, that if the quantity (WT/R) is chosen smaller than absolutely necessary, blade performance will be reduced in terms of the maximum standout and torsional rigidity that can be achieved, or that the size of the housing required for the coiled blade will be too large. There is an evident need to select ribbon parameters that balance the opposing goals of blade standout and torsional rigidity versus ease of coiling and housing dimensions.

While buckling in general is a very complex phenomenon that is influenced by many secondary factors that are difficult to control, it has been determined that if the relationship between the primary factors mentioned above is selected so that (WT/R) is just less than the critical value, $(WT/R)_{CR}$ optimum blade performance will be achieved. Values of the critical buckling ration, $(WT/R)_{CR}$ for various embodiments of conjoined ribbons have been determined as follows:

1. For conjoined ribbons of equal and uniform thickness, the ratio $(WT/R)_{CR}$ is approximately 0.0015 to 0.0020.
2. For conjoined ribbons of different thicknesses as shown in FIG. 2B (and T is the thickness of ribbon 22), or ribbons with thinned regions as shown in FIG. 3b, the ratio $(WT/R)_{CR}$ is approximately 0.002 to 0.004.
3. For conjoined ribbons combining both different thicknesses, and thinned regions, the ratio $(WT/R)_{CR}$ is approximately 0.003 to 0.005.

It may be noted from a comparison of the above critical buckling rations that the various embodiments of the present invention provide considerable benefit in achieving the goals of increased standout and torsional stability with a blade that is still easily coiled and will fit in a standard housing. As mentioned previously, the advantages of the present invention can be achieved using a myriad of blade configurations as illustrated in FIGS. 5a–5e. It is noted that the critical buckling rations given above define the blade parameters necessary to ensure that the blade will have the maximum standout and torsional rigidity achievable with each configuration while still displaying the superior coiling characteristics necessary for a successful spring retractable tape rule.

It is perhaps quite apparent in considering the disclosure of the present invention that certain improvements over currently available and previously disclosed retractable rule assemblies are achievable. As was noted, in practicing the present invention, one is able to create a blade with improved standout and improved torsional rigidity. Blade stability is greatly improved noting that a user could manipulate the blade of this invention in any orientation at or near maximum standout in both push and pull applications. The 360° radial hook allows the blade to be secured to any edge in any orientation noting further that the blade can be printed on both sides for additional flexibility. By incorporating the present invention in blades such as those shown in FIGS. 5b and 5c, lines of demarcation on the blade's surface can be made closer to or actually touching the work surface for improved accuracy. Further, blades can be easily restored to their original beam shape following inadvertent collapse without having to retract the blades and reextend them as is the case with current designs.

Because of the presently disclosed configurations, it has been recognized that when blades are retracted within their housings, abutting volute coils can be made of smaller diameter suitable for use as a hand held device which was not achievable by multi ribbon blades of the prior art. Coils composed of the present designs are more easily retracted using more lightweight springs providing a tighter, more uniform coil configuration. Continuous mash seam welding can be employed to provide stronger blades, greater fatigue life and more resistance to in-coil buckling.

Finally, the blades of the present invention can be tapered, that is, the transverse dimensions of the blades can increase as the blades proceed from their distal hooks to points along the blades corresponding to the maximum standout lengths achievable by the blades, beyond which points the blades maintain fixed transverse dimensions for the remainder of their total lengths. This feature, which is not included in the prior art, reduces the weight which must be supported by the extended blades thereby further increasing maximum standout lengths and torsional stabilities.

The invention claimed is:

1. In a retractable rule assembly including a housing and reel rotatably mounted in the housing and having an elongated blade formed from ribbons of metal having one end connected to said reel and extending from a position tangential to said reel outwardly through an opening in said housing assembly and when retracted within said housing assembly being in the form of an abutting volute coil spring, wherein when coiled, said ribbons are in substantial contact with one another and when extended from said housing assembly, said ribbons assume a tube-like structure, the improvement comprising said elongated metal blade being in the form of first and second ribbons of elongated metal being joined to one another along their lengths and each having a thickness wherein the thickness of the first ribbon is greater than the thickness of the second ribbon and wherein upon forming said abutting volute coil, said first ribbon is coiled inside of said second ribbon.

2. The retractable rule assembly of claim 1 wherein said ribbons of metal are joined by welding the ribbons together along their longitudinally extending edges.

3. The retractable rule assembly of claim 2 wherein said first ribbon comprises a metal blade having a thickness of approximately 0.0025" to 0.005" and said second ribbon comprising a metal blade having a thickness of approximately 0.0010" to 0.0025".

4. The retractable rule assembly of claim 1 wherein said first ribbon comprises a metal blade approximately 1.50 to 2.0 times the thickness of said second ribbon.

5. The retractable rule assembly of claim 1 wherein said elongated blade terminates at a 360° radial hook to facilitate the releasable attachment of said elongated blade to an edge feature of a monument.

6. In a retractable rule assembly including a housing and reel rotatably mounted in the housing and having an elongated blade formed from ribbons of metal having one end connected to said reel and extending from a position tangential to said reel outwardly through an opening in said housing assembly and when retracted within said housing assembly being in the form of an abutting volute coil, wherein when coiled, said ribbons are in substantial contact with one another and when extended from said housing assembly, said ribbons assume a tube-like structure, the improvement comprising said elongated metal blades being in the form of first and second ribbons of elongated metal, each of which having a length along its longitudinal axis, a width and a thickness, said ribbons of elongated metal being joined to one another along their lengths wherein at least the first of said ribbons is characterized as having a thickness which is variable in providing thinned regions created therein along the center of the ribbon's width wherein upon forming said abutting volute coil, said first ribbon is coiled inside of said second ribbon.

7. The retractable rule assembly of claim 6 wherein said thinned regions comprise a series of thinned regions repeated periodically along the longitudinal axis of said first of said ribbons.

8. The retractable rule assembly of claim 7 wherein thinned regions are configured within both ribbons, each thinned region of each ribbon repeated periodically along the longitudinal axis of said elongated blade.

9. The retractable rule assembly of claim 6 wherein the thickness of the ribbon at said thinned regions is approximately between 25 to 75% of the thickness of the ribbon outside of said thinned regions.

10. The retractable rule assembly of claim 6 wherein said thinned regions are positioned along said one of the ribbons across approximately between 25 to 75% of its width.

11. The retractable rule assembly of claim 6 wherein said elongated blade terminates at a 360° radial hook to facilitate the releasable attachment of said elongated blade to an edge feature of a monument.

12. In a retractable rule assembly including a housing and reel of radius R rotatably mounted in the housing and having an elongated blade formed from first and second ribbons of metal, said first ribbon of metal being welded to said second ribbon of metal along their edges thus creating a width W between said welded edges and having one end connected to said reel and extending from a position tangential to said reel outwardly through an opening in said housing assembly and when retracted within said housing assembly being in the form of an abutting volute coil, the improvement comprising selecting the ribbon width between welded edges W and thickness of said first metal ribbon T and reel radius R such that (WT/R) is just less than the critical buckling ratio $(WT/R)_{CR}$ which is approximately 0.0015 to 0.0020".

13. The retractable rule assembly of claim 12 wherein said first ribbon of metal is welded to said second ribbon of metal intermediate said edges creating multiple unjoined portions between welds such that width W is the width of the widest of said unjoined portions.

14. In a retractable rule assembly including a housing and reel of radius R rotatably mounted in the housing and having an elongated blade formed of first and second ribbons of metal having one end connected to said reel and extending from a position tangential to said reel outwardly through an opening in said housing assembly, said first ribbon of metal being welded to said second ribbon of metal along their edges thus creating a width W between said welded edges and when retracted within said housing assembly being in the form of an abutting volute coil, the improvement comprising providing said first ribbon having a thickness T which is greater than the thickness of said second ribbon, and wherein upon forming said abutting volute coil, said first ribbon is coiled inside of said second ribbon and further wherein said width W, first ribbon thickness T and reel radius R are selected such that (WT/R) is just less than the critical buckling ration (WT/R) which is approximately 0.002 to 0.004".

15. The retractable rule assembly of claim 14 wherein said first ribbon of metal is welded to said second ribbon of metal intermediate said edges creating multiple unjoined portions between welds such that width W is the width of the widest of said unjoined portions.

16. In a retractable rule assembly including a housing and reel of radius R rotatably mounted in the housing and having an elongated blade formed of first and second ribbons of metal having one end connected to said reel and extending from a position tangential to said reel outwardly from a position tangential to said reel outwardly through an opening in said housing assembly, said first ribbon of metal being welded to said second ribbon of metal along their edges thus creating a width W between said welded edges and when retracted within said housing assembly being in the form of an abutting volute coil, the improvement comprising providing at least first of said metal ribbons having a thickness which is variable in providing thinned regions created therein along the center of the first ribbon's width whereupon forming said abutting volute coil, said first ribbon is coiled inside of said second ribbon and further wherein said width W, thickness of said first metal ribbon T and reel radius $(WT/R)_{CR}$ is just less than the critical buckling ratio $(WT/R)_{CR}$ which is approximately 0.002 to 0.004".

17. The retractable rule assembly of claim 16 wherein said first ribbon of metal is welded to said second ribbon of metal intermediate said edges creating multiple unjoined portions between welds such that width W is the width of the widest of said unjoined portions.

18. In a retractable rule assembly including a housing and reel of radius R rotatably mounted in the housing and having an elongated blade formed from first and second ribbons of metal said first ribbon of metal being welded to said second ribbon of metal along their edges thus creating a width W between said welded edges and having one end connected to said reel and extending from a position tangential to said reel outwardly through an opening in said housing assembly and when retracted within said housing assembly being in the form of an abutting volute coil, the improvement comprising providing at least first of said metal ribbons having a thickness which is greater than the thickness of said second metal ribbon and which is variable in providing thinned regions created therein along the center of the first ribbon's width wherein upon forming said abutting volute coil, said first ribbon is coiled inside of said second ribbon and further wherein said width W, thickness of first metal ribbon T and reel radius R, (WT/R) is just less than the critical buckling ration $(WT/R)_{CR}$ which is approximately 0.003 to 0.005".

19. The retractable rule assembly of claim 18 wherein said first ribbon of metal is welded to said second ribbon of metal intermediate said edges creating multiple unjoined portions between welds such that width W is the width of the widest of said unjoined portions.

* * * * *